United States Patent [19]

Nouvelle et al.

[11] Patent Number: 4,685,651
[45] Date of Patent: Aug. 11, 1987

[54] THERMOSTATIC CONTROL DEVICES

[75] Inventors: Robert Nouvelle, Claix; Jean L. Segura, Voiron, both of France

[73] Assignee: Dauphinoise Thomson, Grenoble, France

[21] Appl. No.: 744,459

[22] PCT Filed: Oct. 10, 1984

[86] PCT No.: PCT/FR84/00227
§ 371 Date: Jun. 7, 1985
§ 102(e) Date: Jun. 7, 1985

[87] PCT Pub. No.: WO85/01810
PCT Pub. Date: Apr. 25, 1985

[30] Foreign Application Priority Data

Oct. 11, 1983 [FR] France ................. 83 16159

[51] Int. Cl.4 ............... F16K 31/04; G05D 23/19; F03G 7/06
[52] U.S. Cl. ................... 251/11; 236/68 R; 236/93 A; 60/527
[58] Field of Search .......... 236/68 R, 93 A; 251/11; 60/527

[56] References Cited

U.S. PATENT DOCUMENTS

| 3,029,595 | 4/1962 | Sherwood . |
| 3,169,008 | 2/1965 | Whitlock ............... 251/11 |
| 3,263,411 | 8/1966 | Carlson, Jr. et al. . |
| 3,399,543 | 9/1968 | Matthies ............ 236/68 R |
| 3,439,711 | 4/1969 | Sherwood et al. .......... 251/11 |
| 3,442,078 | 5/1969 | Nolan . |

FOREIGN PATENT DOCUMENTS

| 2625561 | 12/1977 | Fed. Rep. of Germany .... 236/68 R |
| 3000388 | 7/1981 | Fed. Rep. of Germany .... 236/68 R |
| 2179952 | 11/1973 | France . |
| 437391 | 10/1935 | United Kingdom ............. 236/68 R |
| 1146122 | 3/1969 | United Kingdom . |

Primary Examiner—Arnold Rosenthal
Attorney, Agent, or Firm—Beveridge, DeGrandi & Weilacher

[57] ABSTRACT

A capsule of a thermic control device contains a substance which expands when heated by an electrical resistor to displace a piston. Devices are disclosed wherein the capsule is disposed transversely in a pipe which carries a circulating fluid, and the front and rear ends of the capsule are sealingly affixed in opposed openings in the wall of the pipe. In one such embodiment, the pipe has two fluid channels; the capsule lies in one channel; and, the piston actuates a valve which is disposed in the other channel.

12 Claims, 8 Drawing Figures

THERMOSTATIC CONTROL DEVICES

The present invention relates to a thermostatic control device of the type comprising a hollow capsule forming a chamber, through one end wall of which a piston passes and which is filled with an expansible substance whose volume varies with the temperature in such a manner as to convert the variation of volume of the substance into an axial displacement of the piston, and further comprising a thermal means in thermal contact with said substance in such a manner as to vary its temperature for the purpose of axially displacing the piston or controlling its displacement relative to the capsule.

Thermostatic control devices of this kind are at present used particularly in the field of motor vehicles. The thermal means consists of a fluid circulating outside the capsule, while the piston serves to control a valve in dependence on the temperature of the fluid. From French Patent No. 2 456 838 a thermostatic control device is also known which is disposed in the fluid circulating in a pipe, and the body of which is movable while the piston is fixed. In this known device a cylindrical bulb fixed to the piston is disposed in the chamber filled with expansible substance and contains an electric resistor fed via the piston, the duct for the flow of the fluid, and its wall.

The present invention seeks to overcome the shortcomings of the prior art and to enlarge the field of use of thermostatic control devices of the type described above, to achieve a considerable improvement of the control and/or variation of the speed of the volume of expansible substance contained in the capsule in a simple manner in order to shorten the response times, and to propose simple connection structures which nevertheless enable the very high internal pressures of the expansible substance to be withstood.

In a first embodiment of the present invention, in which the thermal means comprises at least one electric resistor, the thermostatic control device of the abovementioned type is one in which this electric resistor is carried by the wall forming the opposite end of the capsule to the wall through which the piston passes, this resistor being fed with electric energy through this end wall and extending into the expansible substance in such a manner as to be in direct thermal contact with said substance over at least a part of its length. In this way, the electric resistor is fixed relative to the capsule and therefore held in a suitable manner, and the dispersion of the heat between the electric resistor and the expansible substance is excellent, so that the electric powers necessary for the variation of volume of the expansible substance can be relatively low.

In another embodiment the electric resistor is a wire resistor. In yet another embodiment the electric resistor is an armoured wire resistor comprising an electric wire extending in a casing along its axis, this casing being electrically insulated from this electric wire and being a conductor of heat.

In another embodiment, the electric resistor is printed on an insulating support. In this embodiment the insulating support preferably extends over the periphery of the chamber containing the expansible substance, while the electric resistor is printed on the inner face of this insulating support.

For the purpose of supplying this electric resistor with electric energy, there are preferably provided two electrically insulated conductor pins which pass sealingly through the end wall of the capsule, the ends of the electric resistor being respectively fixed to the inner ends of these pins, while their ends outside the capsule are adapted to be connected to a source of electric energy.

In the embodiment in which the electric resistor is an armoured wire resistor, according to the present invention the ends of this resistor extend through the wall forming the end of the capsule, the ends of its casing being soldered to this end wall and the ends of its electric wire being electrically connected, outside the capsule, to electrical connections carried by the ends of its casing or by the end wall and electrically insulated therefrom, these electrical connections being adapted to be connected to a source of electric energy.

According to the present invention, the wall forming the end of the capsule may advantageously be formed by a separate member on which the electric resistor is mounted and which is subsequently sealingly joined to the body of the capsule. According to the present invention, this member may advantageously be soldered to the body of the capsule. In another embodiment this member may be mounted by crimping on the body of the capsule.

In another variant, the member in question may be formed by a block of insulating material, moulded sealingly around the abovementioned pins. This block may advantageously have a portion projecting inside the capsule and around which the electric resistor may be disposed, this projecting portion possibly having axial grooves on its outer face, while in addition it may be formed by branches.

In another variant of the thermostatic control device according to the present invention, of the type first mentioned above, the thermal means comprises at least one duct for a heat transfer fluid, this duct extending to the interior of the chamber of the capsule so as to be in contact with the expansible substance, and passing through the wall forming the end of the capsule at its opposite end to the wall through which said rod passes, and being carried by that end wall, an electric resistor being thermally associated with this duct outside the capsule, in such a manner as to heat the heat transfer fluid.

According to the present invention, this duct is preferably formed by at least one heat transfer duct fixed sealingly to the wall forming the end of the capsule, one of its ends extending inside the chamber of the capsule and its other end, outside this capsule, being surrounded by an electric resistor.

In all the variants of the thermostatic control device according to the present invention it may appear advantageous, for certain applications, to cover the inside wall of the capsule at least partly with a thermal insulating material. Thus, the expansible substance is insulated from the exterior of the capsule and consequently does not undergo the variations of temperature.

In one example of application of the thermostatic control device according to the present invention, its capsule is fixed in an opening provided in the wall of a fluid pipe in such a manner that at least the outer face of its wall forming the end is accessible from outside the pipe or turned towards the outside.

In one variant it may be mounted on said pipe in such a manner that the fluid circulating in this pipe is in thermal contact with the outer wall of the capsule, the outer face of its wall forming the end remaining accessible from outside said pipe. In this variant the expansible substance is therefore likewise subjected thermally to the temperature of the fluid circulating in the pipe.

In another variant it may be mounted on and outside said pipe in such a manner that its piston extends inside said pipe and constitutes the control means of a valve provided in the latter. In this embodiment the expansible substance is not thermally subjected to the temperature of the fluid circulating in the pipe.

The present invention will be better understood on examination of the thermostatic control devices described as non-limitative examples and illustrated in the drawings, in which.

Figure 1:
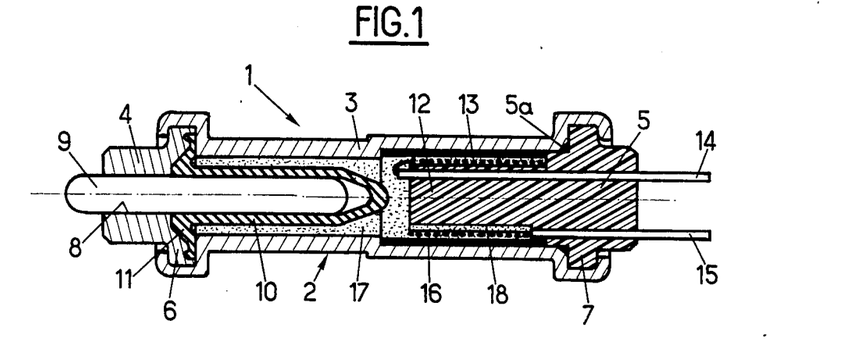
FIG. 1 is an axial section of a first form of construction of the thermostatic control device according to the present invention.

Referring to FIG. 1, it can be seen that the thermostatic control device given the general reference 1 and illustrated in that Figure comprises a hollow capsule 2 which is composed of a body 3 whose wall is cylindrical and one end of which is closed by a ring 4, while the other end is closed by a block 5, the ring 4 and the block 5 being respectively provided with annular shoulders 6 and 7 which are crimped on the corresponding ends of the cylindrical body 3, an annular seal 5a being provided between the block 5 and the body 3.

The end ring 4 has an axial passage 8, through which a control piston or rod 9 extends axially and in which this piston 9 is adapted to be guided during its axial displacements. The end of the piston 9 which extends inside the capsule 2 is enclosed in a flexible diaphragm 10 having an annular lip 11 in contact with the shoulder 6 of the ring 4 and crimped on the corresponding end of the body 3 at the same time as this shoulder 6.

The block 5, which is of an electrically insulating material and which forms the opposite end wall of the capsule 2 to that where the piston 9 is disposed, has a cylindrical portion 12 extending coaxially with the body 3 in the direction of the inner end of the piston 9, in such a manner that an annular space exists between this projecting portion 12 and the wall of the cylindrical body 3 adjacent to it.

Around the projecting portion 12 of the block 5 is wound an electric heating wire resistor 13, which thus extends inside the capsule 2, flat pins 14 and 15 of a material conducting electricity extending through the block 5 and leading out at the end of this block being provided for the purpose of supplying electric energy to the resistor 13, the block 5 being moulded around these pins in such a manner that the connection between the pins 14 and 15 and the block 5 is leaktight.

The portion of the inner wall of the body 3 lying opposite the resistor 13 is covered with a thermally insulating material 15.

The free internal space of the capsule 12, which in particular encloses the flexible diaphragm 10 and also the projecting portion 12 of the block 5, is filled with a substance 17 whose volume varies in dependence on the temperature, this substance 17 usually consisting of wax, so that the wire resistor 13 is embedded in this substance 17 and is in direct thermal contact with the expansible substance 17 over its entire length.

In order to improve contact between the resistor 13 and the substance 17, the projecting portion 12 of the the block 5 is provided on its periphery with axial grooves 18.

The thermostatic control device 1 shown in FIG. 1 functions in the following manner.

With the aid of the pins 14 and 15 extending outside the capsule 2 it is possible to supply electric energy to the wire resistor 13. When this is done, this resistor heats the substance 17, which consequently expands, and this variation of volume brings about the displacement of the piston 9 in the outward direction. By controlling the electric energy supplied to the resistor 13, it is possible to control the rate of variation of the volume of the substance 17 and consequently the displacement and the speed of displacement of the piston 9.

It has been seen that in the thermostatic control device 1 shown in FIG. 1 the piston 9 and the projecting portion 12 of the block 5 axially face one another. The thermostatic control device shown in FIG. 2 and given the general reference 20 contains a block 21 corresponding to the block 5 and having a construction making it possible to reduce the length of the cylindrical body 22 in relation to the length of the cylindrical body 3 in the thermostatic control device 1 shown in FIG. 1.

Figure 2:
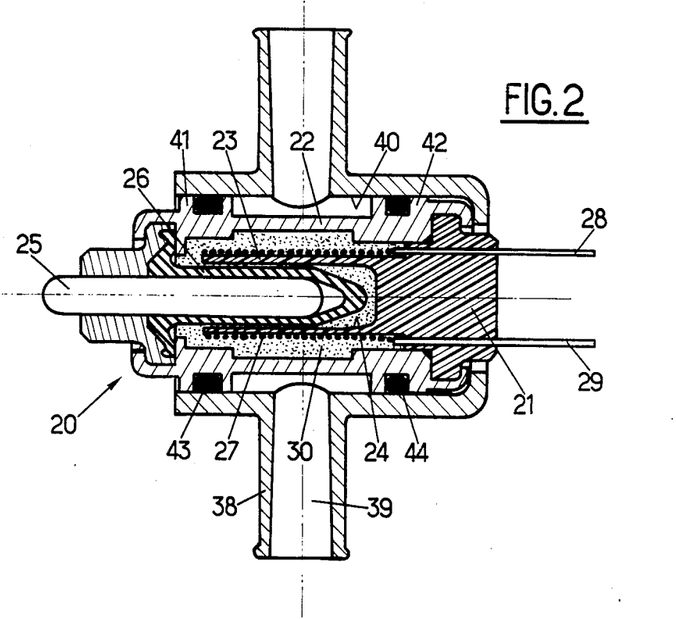
FIG. 2 shows in axial section another thermostatic control device which is mounted in a pipe.

The internal projecting portion 23 of the block 21 has in fact an axial cavity 24 in which the piston 25, surrounded by the diaphragm 26, extends, thus forming a free annular space. The free inside space of the cavity 24 in the block 21 and the space situated between the outer wall of the projecting portion 23—on which is wound a heating wire resistor 27 adapted to be fed by means of its pins 28 and 29 extending through the block 21 and to the outside—and the inner wall of the cylindrical body 23 are in communication at the end of the projecting portion 23 and are filled with an expansible substance 30, while the wire resistor 27 is in direct thermal contact with the expasnsible substance over its entire length.

Apart from these differences, the thermostatic control device 20 shown in FIG. 2 is constructed in an equivalent manner to the thermostatic control device 1 shown in FIG. 1, and functions in the same manner. It may however be observed that the inside wall of the body 22 is not here covered with thermal insulating material. Moreover, in a modified embodiment the projecting portion 23 could be composed of branches extending axially and bounding the cavity 24.

Figure 3:
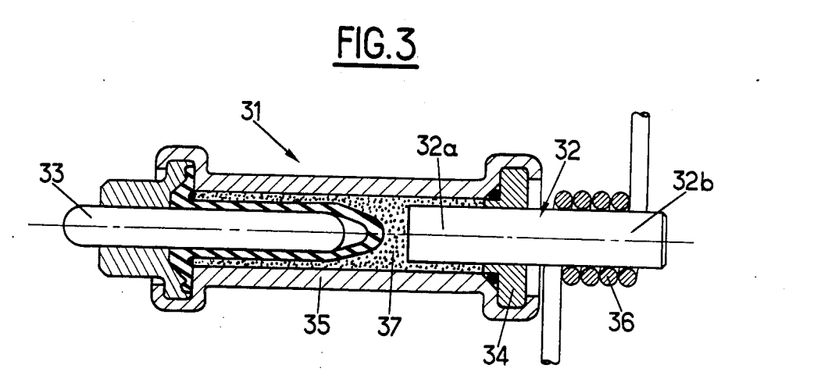
FIG. 3 shows in axial section another form of construction of the thermostatic control device according to the present invention.

The thermostatic control device which is shown in FIG. 3, and which is given the general reference 31, differs from the thermostatic control devices 1 and 20 described previously in that the heating resistors 13 and 27 carried by the blocks 5 and 21 are replaced in this example by a heat transfer tube 31 which extends axially opposite the piston 33 and which is carried by a ring 34 mounted by crimping on the corresponding end of the cylindrical body 35 and constituting the opposite end wall of the capsule to that where the piston 33 is disposed. The heat transfer tube 32 extends through the ring 34 and is fixed there sealingly, for example by soldering, in such a manner as to form an end 32a extending inside the cylindrical cody 35, while its other end 32b extends outside.

In the example shown in FIG. 3, the outer end 32b of the heat transfer tube 32 is surrounded by a winding 36. This winding 36 may be composed of a heating resistor which, on being fed with electric energy, heats the expansible substance 37 contained in the thermostatic control device 31, thereby bringing about its expansion and consequently the axial displacement of the piston 33 in the outward direction. By acting on the electric energy supply of the winding 36 it is possible to vary the temperature of the heat transfer tube 32 and thus to regulate the displacement or the speed of displacement of the piston 33, as previously. It would obviously be possible to provide a plurality of heat transfer tubes 32, which could extend in the space separating the piston 33 from the inside wall of the cylindrical body 35.

Referring to FIG. 2, it can be seen that the thermostatic control device 20 shown in that Figure is mounted on a length of piping 38 having a flow passage 39, and the thermostatic control devices shown in the other Figures could be arranged for the same purpose. This length of piping 38 has a cylindrical chamber 40 which extends at right angles to the flow passage 39 and which is open at both ends. The thermostatic control device 30 is mounted in this chamber 40 in such a manner that the two outer annular shoulders 41 and 42 formed on the cylindrical body 22 are situated one on each side of the flow passage 39. Between the shoulders 41 and 42 and the cylindrical wall of the chamber 40, annular seals 43 and 44 are provided. It follows that the fluid circulated in the flow passage 39 also circulates around the body 22 of the thermostatic control device 20, and in addition that the piston 25 extends outside the pipe 38 and that the outer face of the block 21 is turned towards the outside in such a manner that the pins 28 and 29 are accessible from outside the pipe 38.

Thus, the position of the piston 25 or its changes of position can be controlled or regulated by a combination of respective actions on the expansible substance 30 by the heating resistor 27 fed from outside the pipe 38 and the control device 20, and by the fluid circulating in the flow passage 39 around the body 22.

Figure 4:
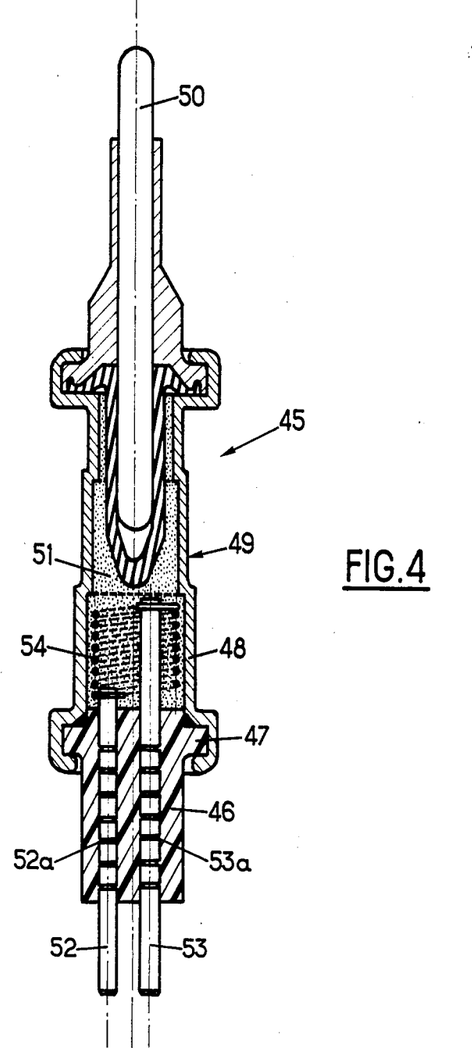
FIG. 4 shows in axial section a form of device resembling that shown in FIG. 1, but of a different construction.

Referring to FIG. 4, it can be seen that this shows a thermostatic control device which is given the general reference 45, and which resembles the thermostatic control devices shown in FIGS. 1 and 2 and operates in the same manner. It differs from them in the following way. Its block 46, which is made of electrically insulating material and which has an annular shoulder 47 sealingly crimped to one end of the cylindrical body 48 of the hollow capsule 49 and constitutes the wall forming the opposite end of this capsule 49 to that where the piston 50 is disposed, has no projecting portion extending inside the chamber 51 containing the expansible substance. The block 46 has cylindrical conductor pins 52 and 53 passing through it, while the electric wire resistor 54, whose ends are connected to the inner ends of the pins 52 and 53, extends in the chamber 51 in the form of a cylindrical coil and is suspended and rigid. The pins 52 and 53 are provided with series of grooves 52a and 53a, which are situated in the block 46 and into which the material of the block 46 penetrates when it is moulded around the pins 52 and 53 in order to provide a seal along these pins.

Figure 5:
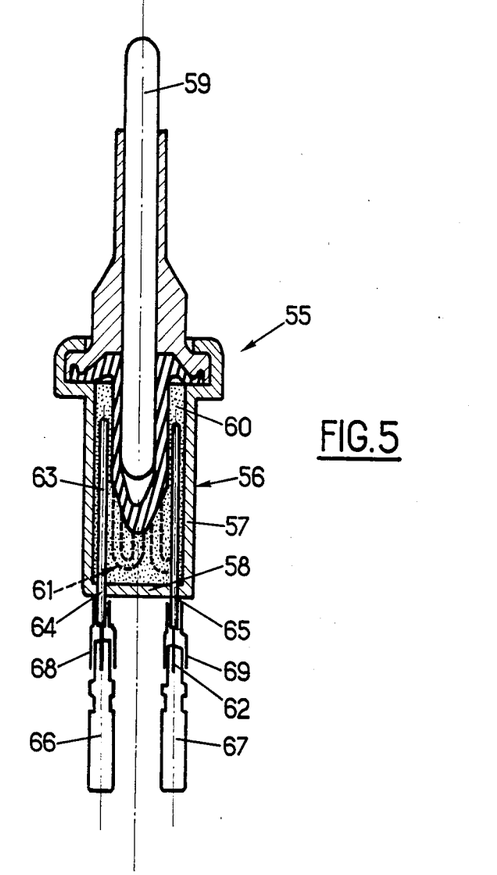
FIG. 5 shows in axial section another form of construction of the thermostatic control device according to the present invention.

In the thermostatic control device shown in FIG. 5, and given the general reference 55, the hollow capsule 56 this time comprises a cylindrical body 57 and a wall 58 forming the opposite end to the piston 59, the wall 58 and the body 57 being in one piece, while the piston 59 is mounted on the other end of the body 57 of the capsule 56 in the same way as previously.

In the inside chamber 60 of the capsule 56, which chamber is as previously filled with an expansible substance, there extends an armoured electric wire resistor 61 comprising axial turns forming a cylinder. This armoured electric wire resistor comprises an inner electric conductor wire 62 surrounded by a casing 63, for example of stainless steel, the electric wire 62 and the casing 63 being electrically insulated. The ends 64 and 65 of this armoured wire resistor 63 pass through the end wall 58 of the hollow capsule 56, the casing 63 of these ends 64 and 65 being sealingly soldered from outside on the end wall 58, while electrical connections 66 and 67 are connected electrically to the ends of the electric wire 62 and are carried by the ends of the casing 63 which are outside the capsule 56, with the aid of insulating rings 68 and 69. This time also, the wire resistor 61 is carried by the end wall 58 and is suspended in the expansible substance 60.

Figure 6:
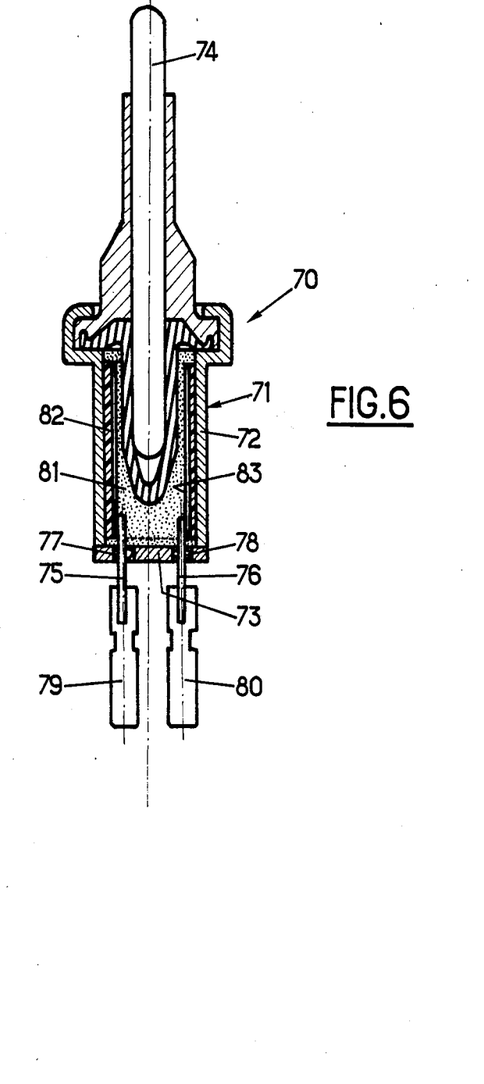
FIG. 6 shows, likewise in axial section, another form of construction of the thermostatic control device according to the present invention.

In the embodiment shown in FIG. 6 the thermostatic control device, which is given the general reference .70, comprises a capsule 71 having a cylindrical body 72 and a wall 73 forming the opposite end to that where the piston 74 is disposed, this wall 73 consisting of a plate sealingly welded to the corresponding end of the cylindrical body 72.

Two conductor pins 75 and 76 pass through this end wall 73, electrically insulating rings 77 and 78, for example of glass, being disposed around the pins 75 and 76 and inside apertures in the end wall 73 through which the pins 75 and 76 pass, in such a manner as to form a leaktight connection, the outer ends of the pins 75 and 76 carrying electrical connections 79 and 80.

Inside the chamber 81 of the capsule 71, which as previously is filled with an expansible substance, is disposed a flexible support 82 of an electrically insulating material, this support bearing against the inner wall of the body 72 and carrying, printed on it, a flat resistor 83 whose ends are connected to the inner ends of the pins 75 and 76, so that this flat resistor has a face in direct thermal contact with the expansible product 81.

Figure 7:
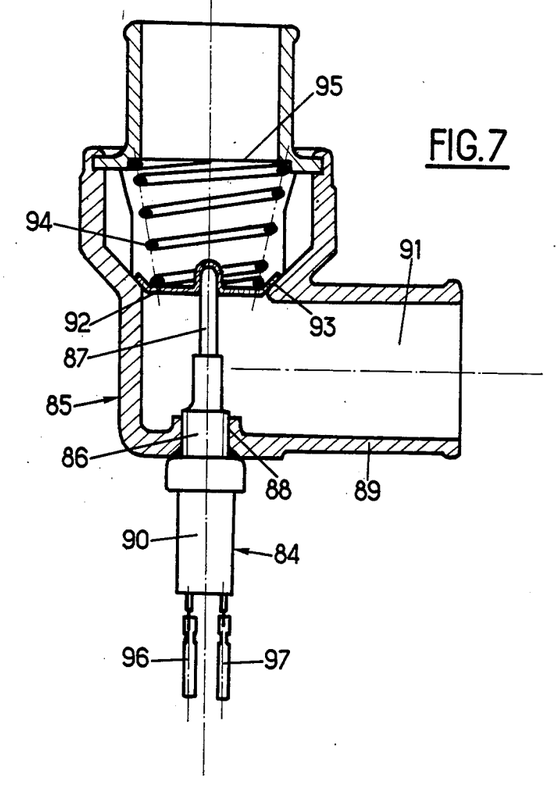
FIG. 7 shows in axial section a thermostatic control device according to the present invention, mounted on a pipe.

Referring to FIG. 7, it can be seen that a thermostatic control device 84 has been mounted on a pipe member 85 of, for example, a cooling circuit of a motor vehicle.

This thermostatic control device 84 could consist of one of the devices described above. It is mounted on the pipe 85 in the following manner. Its ring 86, through which its piston 87 passes, is threaded and screwed into an opening 88 in the wall 89 of the pipe 85 in such a manner that its body 90 extends entirely outside the pipe 85 and its rod 87 extends inside the passage 91 on this pipe 85. The end of the piston 86 bears against a valve closure member closing the passage 91 of the pipe 85, in such a manner that, when said end moves out of the capsule 90, the valve closure member 92 moves away from its valve seat 93, a spring 94, bearing on the one hand against the valve closure member 92 and on the other hand against an annular surface 95 situated on the other side of the rod 87, relative to the valve closure member 92, acting on the valve closure member in the direction bringing it onto its seat 93.

Figure 8:
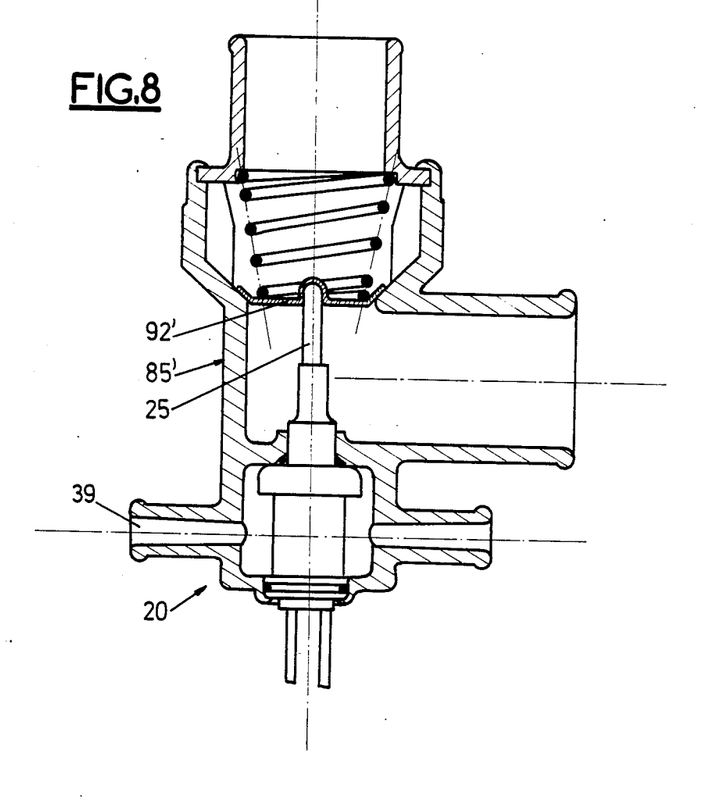
FIG. 8 is a view similar to FIG. 7 but showing the thermostatic control device of FIG. 2 mounted on a valve-carrying pipe member.

FIG. 8 shows the thermostatic control device 20 of FIG. 2 mounted on a pipe 85' and arranged to actuate a valve member 92'.

When electric energy is fed to the resistor contained in the expansible substance contained in the capsule 90, for the purpose of varying its volume and displacing the piston 87 axially, through the medium of the connections 96 and 97 outside the pipe 85, from a controlled and regulated electric energy source, it is possible to control the position of the valve closure member 92 relative to its seat 93 in such a manner as to regulate the flow of fluid in the passage 91 of the pipe 85, while this regulation can be effected in particular in dependence on operating parameters of the engine.

A description will now be given in general terms of the way in which it is possible for the electrical resistors of the thermostatic control devices described above to be mounted in a simple manner.

In the thermostatic control devices shown in FIGS. 1, 2 and 4, blocks are available which form separate parts carrying integrally mounted pins. The wire resistors are formed and mounted on these blocks in the arrangements indicated above, the end of the block carrying the resistor is threaded into the bodies of the capsules, and these blocks are crimped on the appropriate end of these bodies with the interposition of a seal, and the mounting of the resistors is thus completed.

In the example shown in FIG. 5 an armoured wire resistor is formed in the configuration indicated, two holes are pierced through the wall forming the end of the capsule, the resistor thus formed is disposed with its end, which is subsequently to receive the piston, in the body of the capsule, in such a manner that its ends pass through said holes, the ends of the casing of the armoured wire resistor are soldered on this end wall, and the appropriate electrical connections are mounted on the ends of the internal electric wire of this armoured resistor, and the mounting of the armoured wire resistor is thus completed.

In the example shown in FIG. 6 a plate is provided which is intended to form the end wall of the capsule. Two pins are passed through this plate with the aid of insulating sealing rings, a printed resistor is formed on a flexible insulating support, with this insulating support a cylinder is formed in such a manner that the printed resistor will be on the inside, one of the ends of the pins is soldered to the ends of the printed resistor, electrical connections are mounted on the other ends of the pins, the insulating support carrying the printed resistor is threaded into the body of the capsule, and the end wall is sealingly welded to the end of the capsule body, and the mounting of the printed resistor is thus completed.

In the example shown in FIG. 3, the heat transfer tube is mounted in the opening of a ring and soldered, this ring is mounted by crimping on the end of the capsule body, and an electrical resistor is wound around the end of the heat transfer tube outside the capsule.

It can be seen from the above examples that the thermostatic control device according to the present invention is of simple construction and easy to assemble, so that the cost of its manufacture is relatively low, that it provides very good dispersion of heat to the expansible substance and therefore does not require high electric currents for control, and that the means for making the electrical connections are simple and reliable. Furthermore, because the electrical connections to a source of energy are disposed outside its wall forming the opposite end to that where the piston is situated, its mounting on a fluid pipe, for the purpose of using its piston as a control means, is particularly simple and reliable.

The present invention is however not limited to the examples described above. Numerous variants in respect of construction and application can in fact exist. For example, the thermostatic control devices according to the present invention can be used for rapidly regulating the position of a control lever, valves and other parts which have to be controlled in dependence on external parameters on the basis of which the action of the thermal means on the expansible substance is controlled by regulation of a source of electric energy.

We claim:

1. Thermic control device carried by a fluid pipe, said device comprising, a fluid pipe having a flow passage for carrying a circulating fluid, said flow passage having two ends which respectively provide an inlet and an outlet for a circulating fluid which flows through said pipe, said pipe having a sidewall which has a pair of opposed openings formed therein, a hollow capsule forming a chamber which is located between and spaced from the two ends of the pipe, said capsule having a front end provided with a first end wall and a rear end provided with a second end wall, a piston passing through the first end wall of the capsule, said chamber being filled with an expansible substance whose volume varies with the temperature in such a manner as to convert the variation of volume of the expansible substance into an axial displacement of the piston, a thermal means comprising at least one electrical resistor extending in said capsule and in thermal contact with said substance in such a manner as to vary its temperature for the purpose of axially displacing the piston or controlling its displacement relative to said capsule; electrical connecting means extending from said resistor through the second end wall of said capsule, the front and the rear ends of said capsule being sealingly affixed in said opposed openings in the wall of the fluid pipe, said end walls of the capsule facing away from the pipe, said electrical connecting means extending from said capsule to a position which is outside said pipe, said piston projecting from the first end wall of said capsule outside said pipe, said capsule having a section which is located between its front and rear ends and is in thermal contact with the fluid which is circulating in said pipe.

2. A control device according to claim 1 wherein said resistor is a wire resistor.

3. A control device according to claim 1 having two electrically insulated conductor pins which extend sealingly through the second end wall of said capsule, said resistor having ends which are respectively fixed to said pins.

4. A control device according to claim 1 wherein said second end wall of said capsule is a separate part, said resistor being mounted on said separate part, said separate part being joined sealingly to said capsule.

5. A control device according to claim 4 wherein said separate part is a block of insulating material, said electrical conducting means including pins which are sealingly molded in said block of insulating material.

6. A control device according to claim 5 wherein the block of insulating material has a portion projecting inside said capsule, and said resistor is disposed around this projecting portion.

7. Thermic control device carried by a fluid pipe, said device comprising, a pipe having a first fluid circulating channel and a second fluid circulating channel, each of said channels having two ends which respectively provide inlets and outlets for circulating fluids which flow through said pipes, the first channel having a sidewall which has a pair of opposed openings formed therein between the two ends of the first channel, one of said openings extending from the first channel to the second channel, a valve in said second channel, a seat for said valve, a spring biasing said valve in the direction which moves it into its seat, a hollow capsule forming a chamber which has a front end provided with a first end wall and a rear end provided with a second end wall, a piston passing through the first end wall of the capsule, said chamber being filled with an expansible substance whose volume varies with the temperature in such a manner as to convert the variation of volume of the expansible substance into an axial displacement of the piston, a thermal means comprising at least one electrical resistor extending in said capsule and in thermal contact with said substance in such a manner as to vary its temperature for the purpose of axially displacing the piston or controlling its displacement relative to said capsule; electrical connecting means extending from said resistor through the second end wall of said capsule, the front and the rear ends of said capsule being sealingly affixed in said opposed openings in the sidewall of the said first channel, said rear end wall of the capsule facing away from the pipe, said electrical connecting means extending from said capsule to a position which is outside said pipe, said front end of said capsule being exposed to said second channel, said piston projecting outside said first channel and into said second channel, said piston providing control means for said valve and being movable in a direction which lifts the valve off its seat, said capsule having a section which is located between its front and rear ends and is in thermal contact with a fluid which is circulating in said first channel.

8. A control device according to claim 7 wherein said resistor is a wire resistor.

9. A control device according to claim 7 having two electrically insulated conductor pins which extend sealingly through the second end wall of said capsule, said resistor having ends which are resepectively fixed to said pins.

10. A control device according to claim 7 wherein said second end wall of said capsule is a separate part, said resistor being mounted on said separate part, said separate part being joined sealingly to said capsule.

11. A control device according to claim 10 wherein said separate part is a block of insulating material, said electrical conducting means including pins whihc are sealingly molded in said block of insulating material.

12. A control device according to claim 11 wherein the block of insulating material has a portion projecting inside said capsule, and said resistor is disposed around this projecting portion.

* * * * *